US012177943B2

(12) United States Patent
Cuissard et al.

(10) Patent No.: US 12,177,943 B2
(45) Date of Patent: Dec. 24, 2024

(54) WIRELESS BACKHAULING SYSTEM USING A MONO-TUNNEL FOR FAST-MOVING MOBILE DOMAINS

(71) Applicant: Cisco Technology, Inc., San Jose, CA (US)

(72) Inventors: Vincent Cuissard, Eteaux (FR); Domenico Ficara, Essertines-sur-Yverdon (CH); Alessandro Erta, Licciana Nard (IT); Luca Bisti, Grosseto (IT); Kasi Nalamalapu, Cupertino, CA (US); Sudhir Kumar Jain, Fremont, CA (US); Salvatore Valenza, Pomy (CH); Arun Khanna, Sunnyvale, CA (US); Stefano Ferrari, Le mont sur Lausanne (CH); Loris Gazzarrini, Lausanne (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/111,625

(22) Filed: Dec. 4, 2020

(65) Prior Publication Data

US 2022/0183111 A1   Jun. 9, 2022

(51) Int. Cl.
*H04W 76/00* (2018.01)
*H04W 4/40* (2018.01)
(Continued)

(52) U.S. Cl.
CPC ............ *H04W 88/16* (2013.01); *H04W 4/40* (2018.02); *H04W 40/24* (2013.01); *H04W 76/11* (2018.02);
(Continued)

(58) Field of Classification Search
CPC ....... H04W 88/16; H04W 4/40; H04W 40/24; H04W 76/11; H04W 76/12; H04W 92/02; H04W 92/24
See application file for complete search history.

(56) References Cited

U.S. PATENT DOCUMENTS 7,483,387 B2   1/2009   Guichard et al.
7,554,996 B2   6/2009   Previdi et al.
(Continued)

FOREIGN PATENT DOCUMENTS

EP   1598255 A1   11/2005
EP   1686739 A1    8/2006
WO  2013082456 A1   6/2013

OTHER PUBLICATIONS

Berzin et al., "Mobility label based network: Hierarchical mobility management and packet forwarding architecture", Computer Networks, Elsevier Science Publishers B.V., Amsterdam, NL, vol. 53, No. 12, Aug. 13, 2009, 29 pages.
(Continued)

*Primary Examiner* — Lakeram Jangbahadur
(74) *Attorney, Agent, or Firm* — BEHMKE INNOVATION GROUP LLC; James M. Behmke; Keith O. Mitchell

(57) ABSTRACT

In one embodiment, a gateway to a Layer-3 network forms a first Layer-2 tunnel between the gateway and a first wireless access point (AP) that communicates wirelessly with a first mobile node of a mobile system (MS) via a first wireless connection. The gateway generates a mapping that associates an onboard device of the MS with the first AP and an identifier for the MS, based on traffic conveyed via the first Layer-2 tunnel and associated with the onboard device, the traffic comprising a header that indicates the identifier for the MS. The gateway receives, from a second AP, an indication that the MS is roaming from the first wireless
(Continued)

connection to a second wireless connection, the indication including the identifier for the MS. The gateway updates the mapping to associate the onboard device of the MS with a second AP, based on the indication that the MS is roaming.

16 Claims, 10 Drawing Sheets

(51) Int. Cl.
    *H04W 40/24*     (2009.01)
    *H04W 76/11*     (2018.01)
    *H04W 76/12*     (2018.01)
    *H04W 88/16*     (2009.01)
    *H04W 36/00*     (2009.01)
    *H04W 92/02*     (2009.01)
    *H04W 92/24*     (2009.01)

(52) U.S. Cl.
    CPC ........ *H04W 76/12* (2018.02); *H04W 36/0069* (2018.08); *H04W 92/02* (2013.01); *H04W 92/24* (2013.01)

(56) References Cited

U.S. PATENT DOCUMENTS

| | | | |
|---|---|---|---|
| 7,616,574 B2 | 11/2009 | Previdi et al. | |
| 7,710,872 B2 | 5/2010 | Vasseur | |
| 7,848,329 B2 | 12/2010 | Berzin | |
| 7,929,557 B2 | 4/2011 | Kompella | |
| 8,081,611 B2 | 12/2011 | Berzin et al. | |
| 8,144,715 B2 | 3/2012 | Ould Brahim et al. | |
| 8,305,959 B2 | 11/2012 | Berzin | |
| 8,385,332 B2 | 2/2013 | Aggarwal | |
| 8,422,514 B1 | 4/2013 | Kothari et al. | |
| 8,451,752 B2 | 5/2013 | Lu | |
| 8,451,837 B1 | 5/2013 | Schuett et al. | |
| 8,514,864 B2 | 8/2013 | Berzin | |
| 8,576,848 B2 | 11/2013 | Saad et al. | |
| 8,599,865 B2 | 12/2013 | Venkataswami et al. | |
| 8,611,359 B1 | 12/2013 | Kompella et al. | |
| 8,737,394 B2 | 5/2014 | Dong et al. | |
| 8,937,950 B2 | 1/2015 | Dunbar et al. | |
| 9,413,647 B2 | 8/2016 | Schatzmayr | |
| 9,491,686 B2 | 11/2016 | Bosch et al. | |
| 9,609,569 B2 | 3/2017 | Byers et al. | |
| 9,769,708 B2 | 9/2017 | Bisti et al. | |
| 9,877,251 B2 | 1/2018 | Stager et al. | |
| 9,918,217 B1* | 3/2018 | Hooda | H04W 8/02 |
| 9,955,396 B1 | 4/2018 | Heinz | |
| 10,681,606 B2 | 6/2020 | Zhou | |
| 2005/0254818 A1 | 11/2005 | Zhou et al. | |
| 2009/0016334 A1 | 1/2009 | Forsberg et al. | |
| 2010/0260146 A1* | 10/2010 | Lu | H04L 12/4633 370/331 |
| 2011/0103284 A1* | 5/2011 | Gundavelli | H04W 40/248 370/312 |
| 2012/0099538 A1* | 4/2012 | Venkataswami | H04L 47/24 370/329 |
| 2012/0163317 A1 | 6/2012 | Yu | |
| 2014/0177637 A1 | 6/2014 | Duncan et al. | |
| 2015/0078333 A1* | 3/2015 | Byers | H04W 36/32 370/331 |
| 2015/0223118 A1* | 8/2015 | Bisti | H04L 45/50 370/331 |
| 2015/0372948 A1 | 12/2015 | Fanara | |
| 2016/0366620 A1 | 12/2016 | Royon | |
| 2018/0376399 A1* | 12/2018 | Zhou | H04W 36/32 |
| 2021/0126858 A1* | 4/2021 | Bisti | H04W 40/20 |

OTHER PUBLICATIONS

Berzin, et al., "Mobility Support Using MPLS and MP-BGP Signaling", Internet Engineering Task Force (IETF), Standard Working Draft, Internet Society (ISOC), 4 rue des Falaises, CH-1205, Geneva, Apr. 28, 2008, 60 pages.

European Patent Office, International Search Report issued Oct. 15, 2013 in corresponding PCT Application No. PCT/EP2013/068761, filed Sep. 10, 2013.

Zhao, et al., "Protection Mechanisms for Label Distribution Protocol P2MP/MP2MP Label Switched Paths", Internet Engineering Task Force (IETF), Standard Working Draft, Internet Society (ISOC), 4 rue des Falaises, CH-1205, Geneva, Mar. 13, 2012, 22 pages.

European Search Report issued on Apr. 12, 2022, in connection with European Patent Application No. 21210684.3.

* cited by examiner

WIRELESS BACKHAULING SYSTEM USING A MONO-TUNNEL FOR FAST-MOVING MOBILE DOMAINS

TECHNICAL FIELD

The present disclosure relates generally to computer networks, and, more particularly, a wireless backhauling system using a mono-tunnel for fast-moving mobile domains.

BACKGROUND

Cellular network coverage has made Internet connectivity increasingly ubiquitous. This has led to an ever-increasing demand for bandwidth, to accommodate traffic such as multimedia content and communications (e.g., bandwidth-intensive high definition video streaming or real time video calls, etc.). For instance, passengers of public transportation now expect on-board, high-speed connectivity, which implies a reliable wireless ground-to-vehicle communication.

In general, mobile wireless backhauling is challenging, particularly in cases of fast-moving domains, such as trains, busses, mine carts, trucks, cranes, and the like. These vehicles have to provide connectivity to onboard wired and/or wireless devices without any interruptions. Cellular technologies, such as Long-Term Evolution (LTE), are typically not practical for such scenarios, so backhauling is performed by Wi-Fi between mobile nodes (e.g., on a train) and distributed nodes along the path (e.g., trackside nodes along the rails). However, roaming under the various Wi-Fi standards, however, is often too slow for seamless roaming in these cases. In other words, some message exchanges in fast-moving situations may take too long to occur before the previous link breaks due to the movement of the mobile node.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
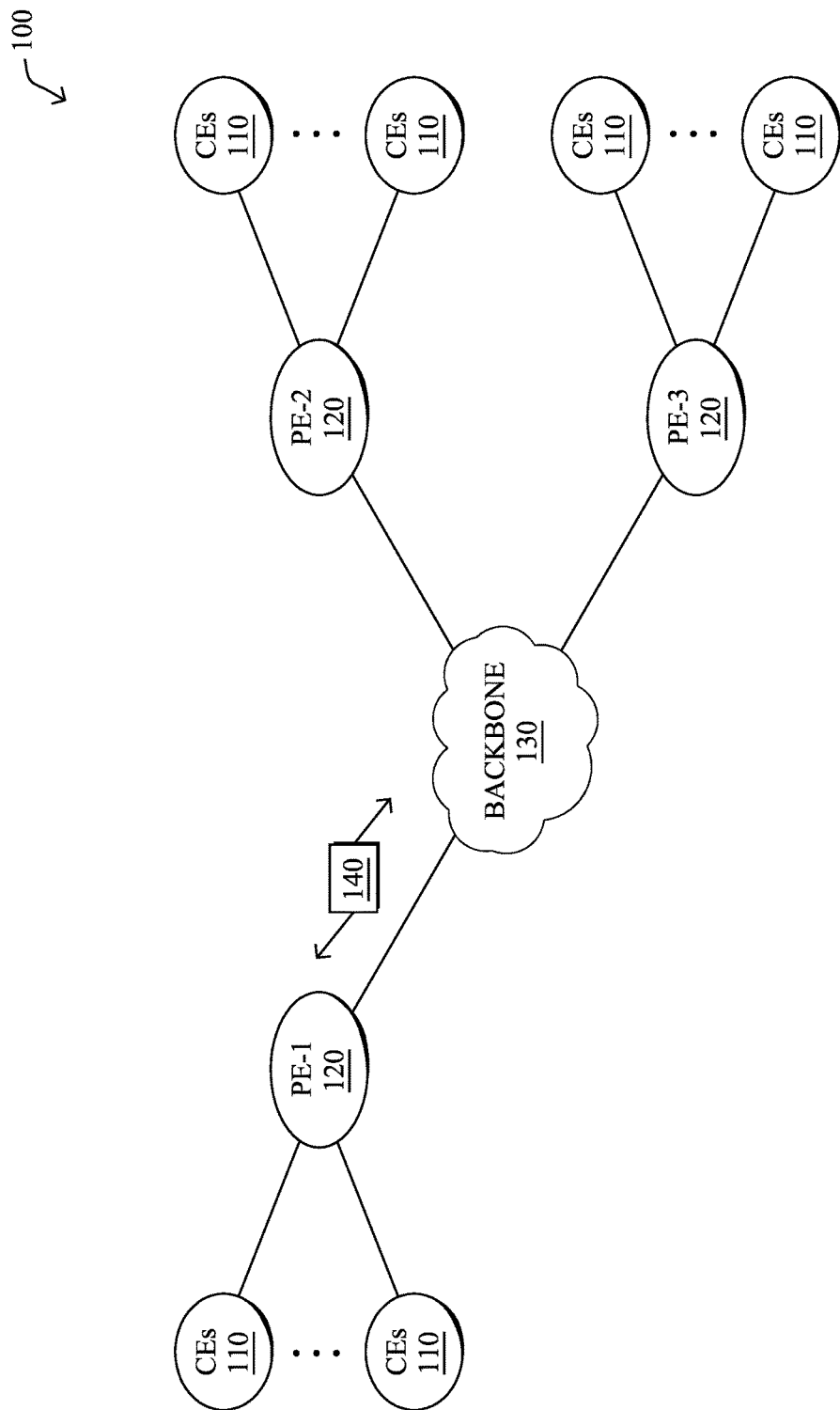
FIGS. 1A-1B illustrate an example communication network.

According to one or more embodiments of the disclosure, a gateway to a Layer-3 network forms a first Layer-2 tunnel between the gateway and a first wireless access point. The first wireless access point communicates wirelessly with a first mobile node of a mobile system via a first wireless connection. The gateway generates a mapping that associates an onboard device of the mobile system with the first wireless access point and an identifier for the mobile system, based on traffic conveyed via the first Layer-2 tunnel and associated with the onboard device, the traffic comprising a header that indicates the identifier for the mobile system. The gateway receives, from a second wireless access point, an indication that the mobile system is roaming from the first wireless connection to a second wireless connection between the second wireless access point and a second mobile node of the mobile system, the indication including the identifier for the mobile system. The gateway updates the mapping to associate the onboard device of the mobile system with the second wireless access point, based on the indication that the mobile system is roaming.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
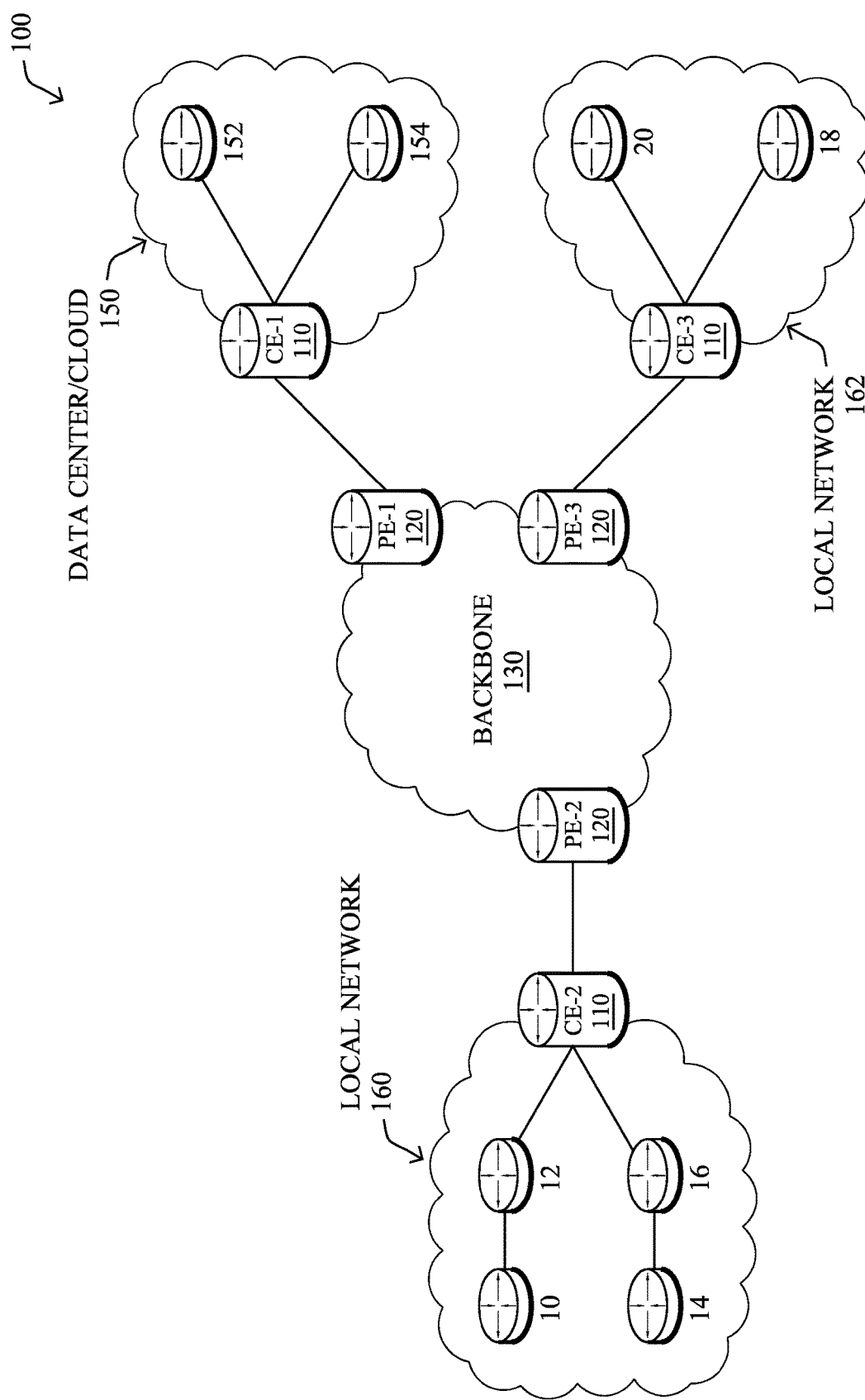

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
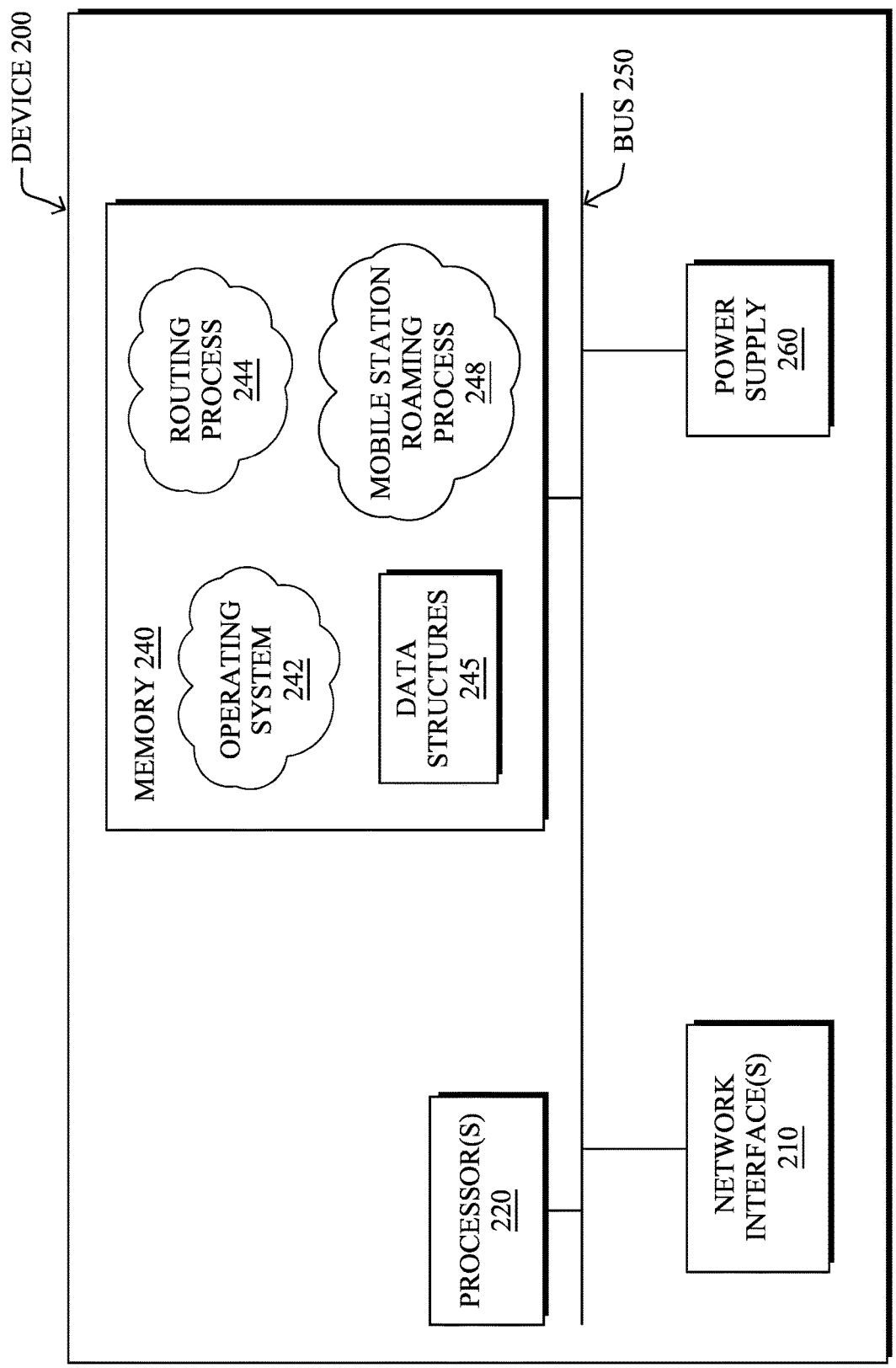
FIG. 2 illustrates an example network device/node.

FIG. 2 is a schematic block diagram of an example node/device 200 that may be used with one or more embodiments described herein. As shown, device 200 may comprise one or more communication interfaces 210 (e.g., wired, wireless, etc.), at least one processor 220, and a memory 240 interconnected by a system bus 250, as well as a power supply 260 (e.g., battery, plug-in, etc.).

Communication interface(s) 210 include the mechanical, electrical, and signaling circuitry for communicating data over a communication link. To this end, communication interface(s) 210 may be configured to transmit and/or receive data using a variety of different communication protocols, such as TCP/IP, UDP, Ethernet, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processors and/or services executing on the device. These software processors and/or services may comprise a routing process 244 and/or a mobile system roaming process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process 244 includes instructions executable by processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In general, mobile system roaming process 248 includes instructions executable by processor 220 to perform functions related to a mobile system roaming from one wireless access point to another. To this end, mobile system roaming process 248 may operate in conjunction with routing process 244, in some instances, to ensure that traffic destined for a device located onboard a mobile system is delivered to that device, before, during, and after the roaming handoff.

Figure 3:
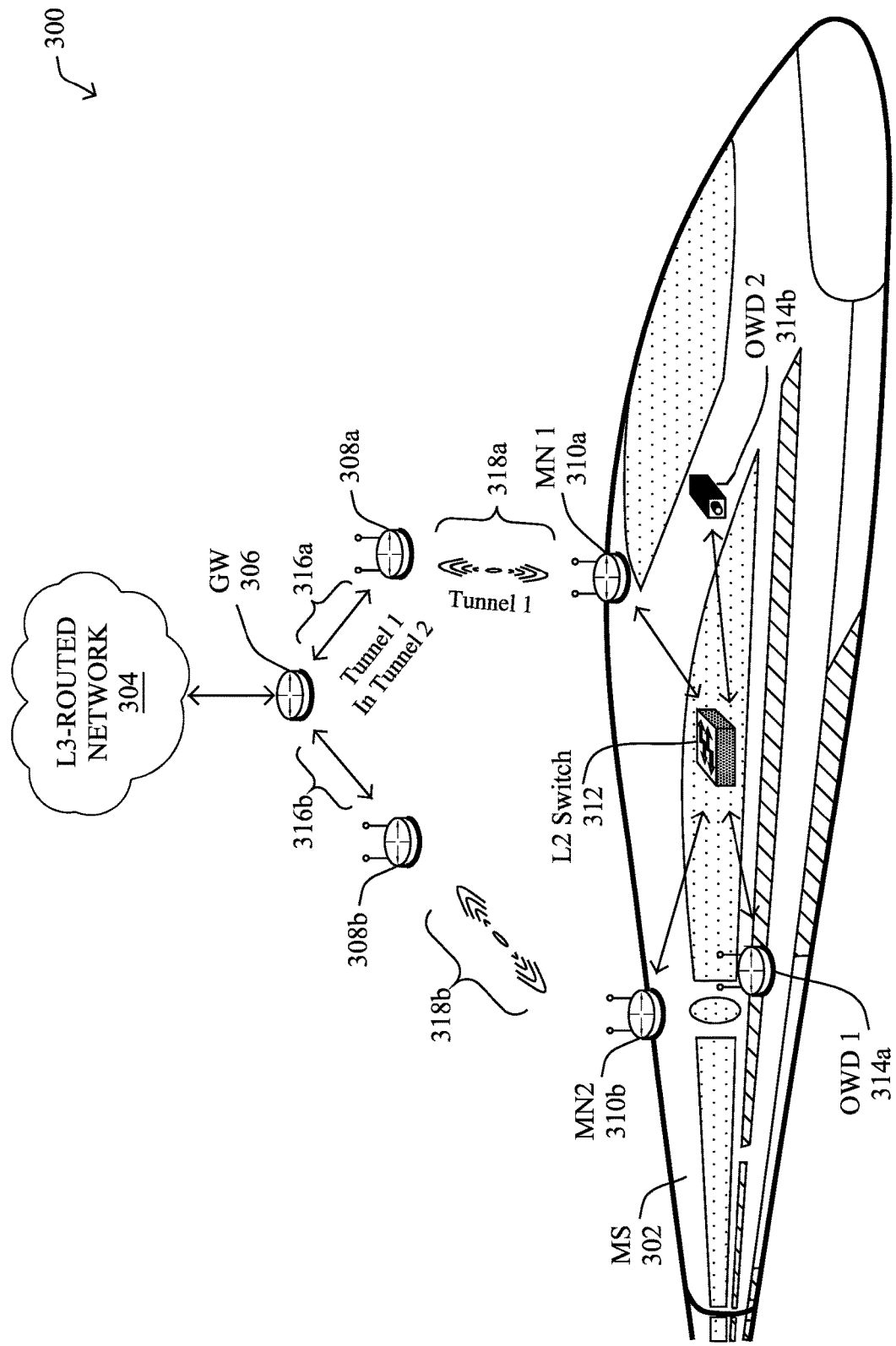
FIG. 3 illustrates an example of a mobile system communicating wirelessly.

FIG. 3 illustrates an example 300 of a mobile system communicating wirelessly, according to various embodiments. As shown, the mobile system 302, denoted "MS" in the Figures for simplicity, may generally take the form of any mobile object or set of objects equipped with its own internal network and configured to communicate wirelessly with a backhauling system during motion. For instance, mobile system 302 may take the form of a train, bus, airplane or other flying vehicle, ferry, automobile, mine cart, crane, truck, another form of vehicle that may be used for transportation or ship, another form of vehicle that may be found in a worksite, mining location, industrial site, factory, or the like. In further cases, mobile system 302 may be a fully-autonomous, or partially-autonomous, vehicle.

Onboard mobile system 302 may be various networking devices that support the mobile domain of mobile system 302. In some embodiments, as shown, there may be a Layer-2 (L2) switch 312 onboard mobile system 302 that is connected to any number of onboard devices 314 within the mobile domain of mobile system 302. For instance, onboard device 314a may take the form of an onboard Wi-Fi access point that provides connectivity to any number of user devices (e.g., mobile phones, computers, etc.) of passengers being transported by mobile system 302. Conversely, onboard device 314b may take the form of a security camera that is also connected to L2 switch 312. In various embodiments, some or all of the onboard devices 314 may be onboard wired devices (OWDs), meaning that they communicate with L2 switch 312 via wired connections, such as an Ethernet network or the like.

According to various embodiments, the mobile domain of mobile system 302 may also include a plurality of mobile nodes 310, denoted "MN" in the Figures for simplicity. For instance, as shown, mobile system 302 may include a first MN 310a and a second MN 310b. Each MN 310 may generally include: 1.) a wireless interface to exchange data with wireless access points of the backhaul network and 2.) a local interface to exchange data with the local network of mobile system 302. For instance, MN 310a and MN 310b may each have a wired connection to L2 switch 312.

As would be appreciated, MN 310a and MN 310b may be located on mobile system 302 at a distance from one another, so as to provide spatial diversity to the potential wireless connection points utilized by mobile system 302. For example, MN 310a may be located near the front of mobile system 302 (e.g., the head-end of a train), while MN 310b may be located farther towards the rear of mobile system 302 than that of MN 310a. Thus, even if a particular MN 310 does not have a reliable wireless connection to the backhaul system, another MN 310 of mobile system 302 may (e.g., if the train is going around a curve in the track, etc.). In some instances, MNs 310 may also offer frequency diversity, as well, such as by operating on different frequencies, at least part of the time. As a result, even if one frequency is experiencing interference, the other frequency could be used to form a wireless connection between mobile system 302 and the backhaul system.

Located along the path of travel of mobile system 302 (e.g., a railroad track, a road, a waterway, a runway, etc.) may be any number of wireless access points 308. For instance, as shown, there may be trackside access points 308a-308b shown, denoted "tAPs," in the Figures for simplicity. Note that while these wireless access points are referred to herein as 'trackside,' their locations can be varied depending on the deployment scenario (e.g., roadside, etc.).

During operation, tAPs 308a-308b may form wireless connections with MN 310a and/or MN 310b, to provide wireless connectivity to mobile system 302 as it travels. To this end, each tAP 308 may include at least 1.) a wireless interface to communicate with a MN 310 and 2.) an interface to communicate with a gateway, denoted "GW" 306 in the Figures for simplicity. Typically, the connections between tAPs 308a-308b and GW 306 are wired connections that use a suitable wired communication protocol, such as Ethernet.

GW 306 represents the other end of the backhauling system and provides Layer-3 (L3) routing functions. To do so, GW 306 may include at least one interface connected to L3-routed network 304, as well as any number of interfaces to communicate with tAPs 308. For instance, L3-routed network 304 may take the form of the Internet, in many instances, although the techniques herein may be extended to any number of different types of external networks, as desired.

Traditionally, a backhaul system supporting mobile domains/stations relies on the use of multiple tunnels, to convey traffic between the L3 gateway and the mobile domain/station. For instance, as shown, assume that MN 310*a* has formed a wireless connection 318*a* with tAP 308*a*. Such a connection may be formed using a suitable transmission protocol, such as the Prodigy protocol by Fluidmesh (now Cisco Systems) or another wireless protocol that supports extremely fast handoffs. Consequently, MN 310*a* may establish a first tunnel over wireless connection 318*a*. GW 306 and tAP 308*a* may form a second tunnel via their connection 316*a*, likewise. Thus, when tAP 308*a* sends traffic that it receives from MN 310*a* towards GW 306, it may encapsulate the traffic and tunneled via the first tunnel, which tAP 308*a* then encapsulates for transport via the second tunnel to GW 306. A similar approach may be taken with respect to wireless connection 318*b* between MN 310*b* and tAP 308*b*, as well as connection 316*b* between tAP 308*b* and GW 306.

As noted above, MS 302 roaming between tAPs 308 can be particularly challenging, due to the speed at which mobile system 302 may be traveling. Indeed, 802.11 roaming may be too slow in many circumstances for seamless roaming. Consequently, message exchanges may be too long to complete before the previous link/connection breaks.

Wireless Backhauling System Using a
Mono-Tunnel for Fast-Moving Mobile Domains

The techniques herein introduce a mono-tunnel approach for wireless backhauling systems to support fast-moving mobile domains, particularly those equipped with multiple mobile nodes. In some aspects, a mobile system identifier may be conveyed to the gateway of the backhauling system at the time of roaming handoffs, allowing the gateway to send traffic destined for a destination in the mobile domain via the new wireless connection and without interruption.

Illustratively, the techniques described herein may be performed by hardware, software, and/or firmware, such as in accordance with the mobile system roaming process 248, which may include computer executable instructions executed by the processor 220 (or independent processor of interfaces 210) to perform functions relating to the techniques described herein, potentially in conjunction with routing process 244.

Specifically, according to various embodiments, a gateway to a Layer-3 network forms a first Layer-2 tunnel between the gateway and a first wireless access point. The first wireless access point communicates wirelessly with a first mobile node of a mobile system via a first wireless connection. The gateway generates a mapping that associates an onboard device of the mobile system with the first wireless access point and an identifier for the mobile system, based on traffic conveyed via the first Layer-2 tunnel and associated with the onboard device, the traffic comprising a header that indicates the identifier for the mobile system. The gateway receives, from a second wireless access point, an indication that the mobile system is roaming from the first wireless connection to a second wireless connection between the second wireless access point and a second mobile node of the mobile system, the indication including the identifier for the mobile system. The gateway updates the mapping to associate the onboard device of the mobile system with the second wireless access point, based on the indication that the mobile system is roaming.

Figure 4:
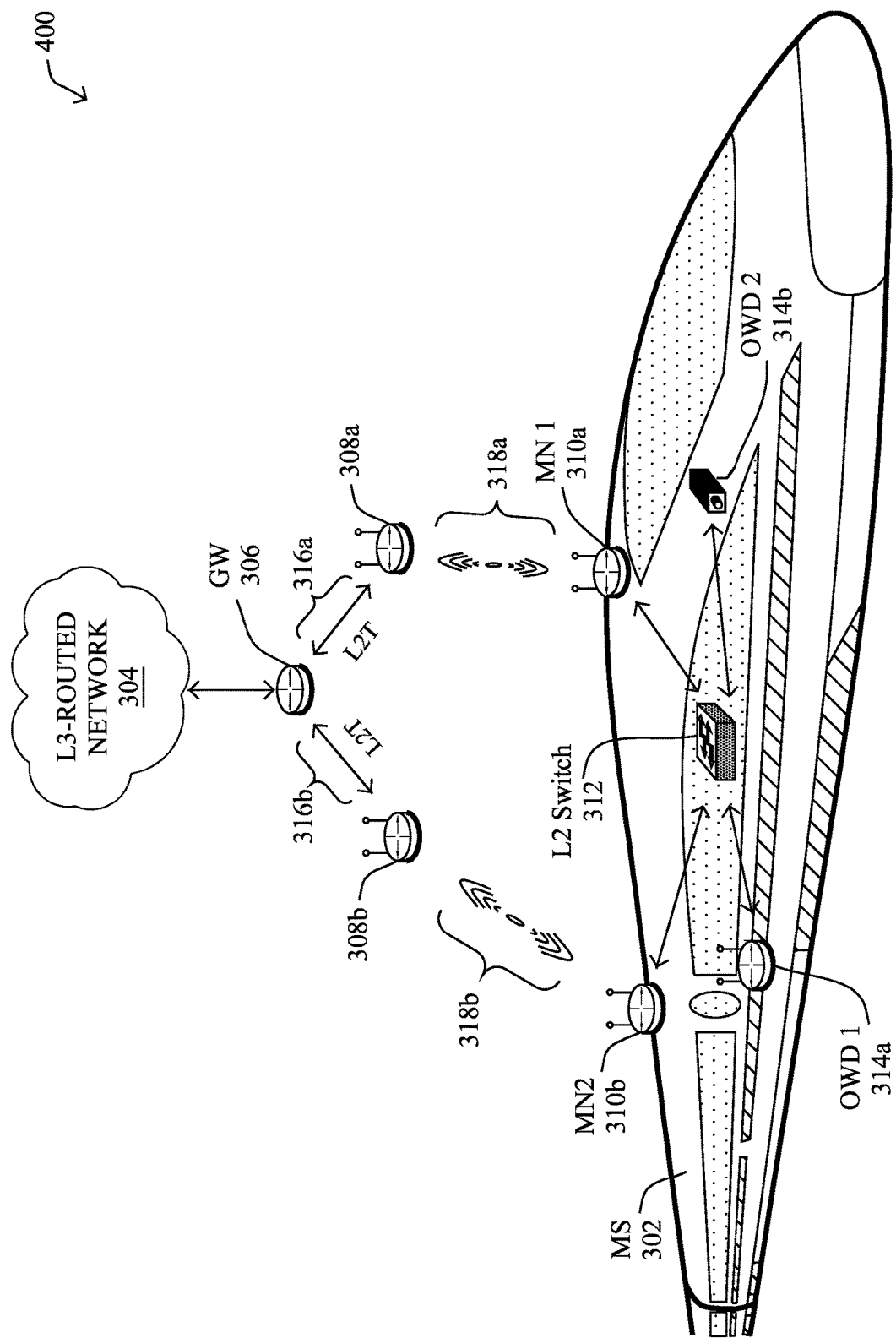
FIG. 4 illustrates an example of a mobile system communicating wirelessly with a backhauling system employing Layer-2 tunnels.

Operationally, FIG. 4 illustrates an example 400 of a mobile system communicating wirelessly with a backhauling system employing Layer-2 tunnels, according to various embodiments. Continuing the example of FIG. 3, again assume that there is a mobile node 302 that is to communicate wirelessly with a backhauling system comprising a plurality of tAPs 308 and a GW 306 that provides connectivity to an L3-routed network 304.

In various embodiments, and in contrast to the scenario in FIG. 3, a single L2 tunnel (denoted L2T in FIG. 4) may be established between each tAP 308 and GW 306. This tunnel will carry L2 traffic between GW 306 and the MN 310 to which the tAP 308 is connected. For instance, a first L2 tunnel may be formed between GW 306 and tAP 308*a* over which traffic conveyed between tAP 308*a* and MN 310*a* may be transported, assuming that wireless connection 318*a* exists. Similarly, another GW 306 and tAP 308*b* may form a second L2 tunnel over which traffic conveyed between tAP 308*b* and MN 310*b* may be transported, assuming that wireless connection 318*a* exists.

According to various embodiments, a unique identifier may be assigned to MS 302, denoted "MSID" in the Figures for simplicity. For instance, an MSID may be assigned by a centralized server to mobile system 302 or, alternatively, may be preconfigured on mobile system 302 and advertised by mobile system 302 to the backhauling system. In further embodiments, the MSID for mobile system 302 may be included in an L2 tunnel header field for the payload frames conveyed between MS 302 and GW 306 via the active L2 tunnel. For instance, assume that MS 302 is currently connected to the backhauling system via wireless connection 318*a*. In such a case, any traffic conveyed over the corresponding tunnel may include a tunnel header with the MSID of mobile system 302.

As would be appreciated, GW 306 will not have knowledge of the various onboard devices of mobile system 302, such as onboard devices 314*a*-314*b*, at the time MN 310*b* attaches to tAP 308*a* to form wireless connection 310*a*. However, by including the MSID of mobile system 302 in the tunnel header of any traffic associated with a particular onboard device 314, GW 306 may learn this association over time. In turn, in various embodiments, GW 306 may form a mapping based in part on the tunnel header information that associates a particular onboard device 314, mobile system 302, and a particular tAP 308 to which mobile system 302 is connected.

Figure 5A:
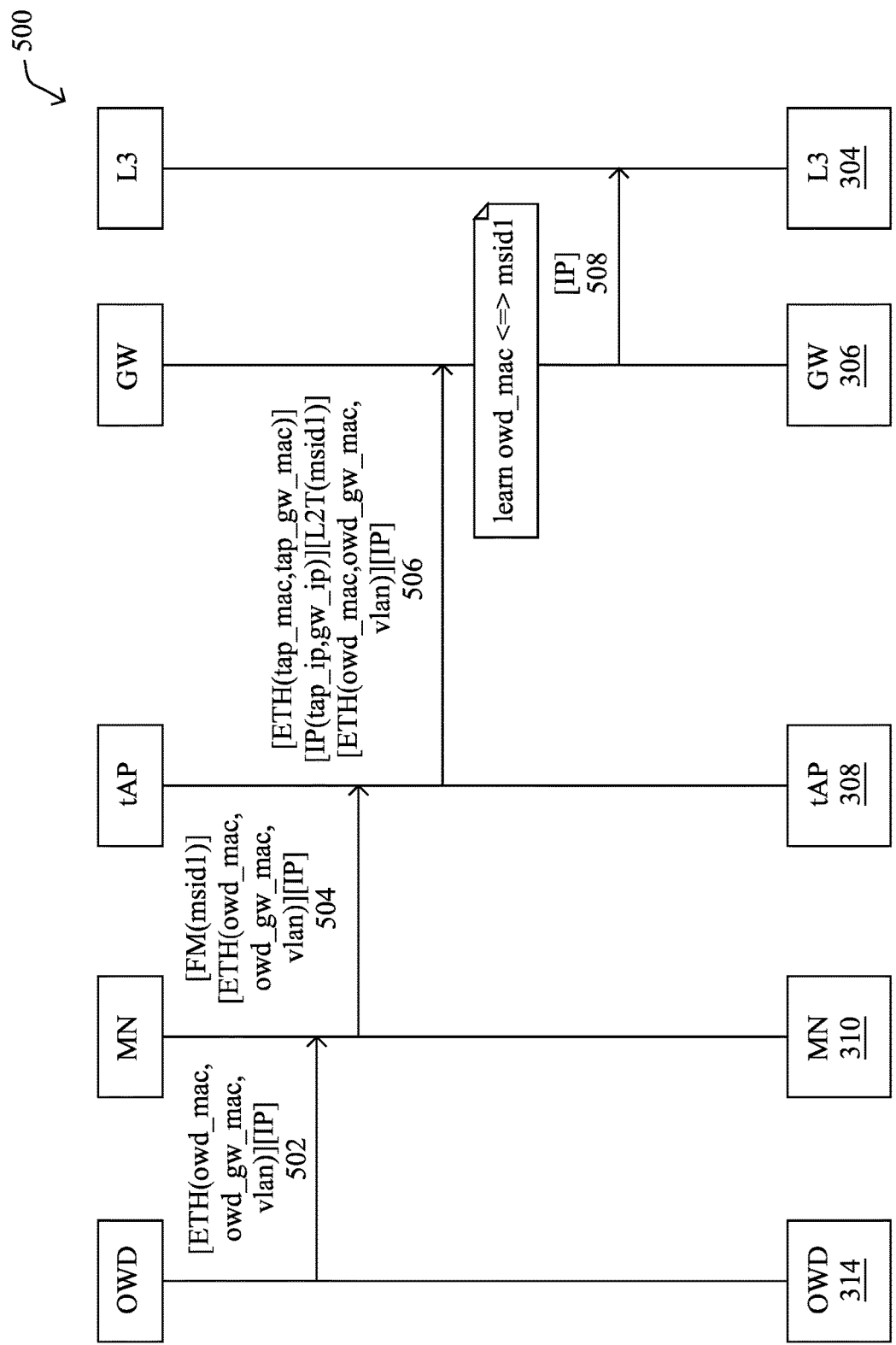
FIGS. 5A-5B illustrate example communication diagrams showing upstream and downstream traffic of an onboard device of a mobile system.

FIG. 5A illustrates an example communication diagram 500 showing upstream traffic of onboard device of a mobile system, according to various embodiments. As shown, assume that there is an OWD 314 located on mobile system 302 that is to send traffic via L3-routed network 304, described previously. To do so, it may send a communication 502 (e.g., via Ethernet, in the wired case) to a particular MN 310 of mobile system 302 that indicates information such as its media access control (MAC) address, the gateway MAC for OWD 314, a virtual LAN (VLAN) identifier, IP address information, or the like.

In response to receiving communication 502, MN 310 may send a corresponding communication 504 to tAP 308 to which it is attach. As shown, communication 504 may include the payload of communication 502 and its header information. In addition, in various embodiments, MN 310 may also include the MSID of mobile system 302 in communication 504, thereby indicating that corresponding communication 504 was sent by communication 502.

According to various embodiments, tAP 308 may then send a communication 506 to GW 306 that includes the payload and header information of communication 502, header information indicating the address of tAP 308, as well as including the MSID sent by MN 310 in the L2 tunnel header. In doing so, as shown, GW 306 may process communication 506, to learn that the MAC address of OWD 314 is associated with the MSID of mobile system 302 on which OWD 314 is located. As this MSID is also associated with tAP 308, GW 306 may store this mapping for further reference, when traffic needs to be sent to OWD 314. GW 306 may then process communication 506 normally, such as by routing the message as an IP-based communication 508 via L3-routed network 304 (e.g., the Internet).

By way of example, one such mapping learned by GW 306 may be of the following form:

TABLE 1

| OWD MAC | MSID | tAP MAC |
|---|---|---|
| 6300.6300.6300.6300 | FF0001 | 0102.03AA.0001 |

As would be appreciated, the above mapping may be stored as a single table entry that associates an address of OWD 314, the MSID of its mobile system 302, and the tAP 308 to which mobile system 302 is attached or, alternatively, across any number of table entries, in various embodiments.

Figure 5B:
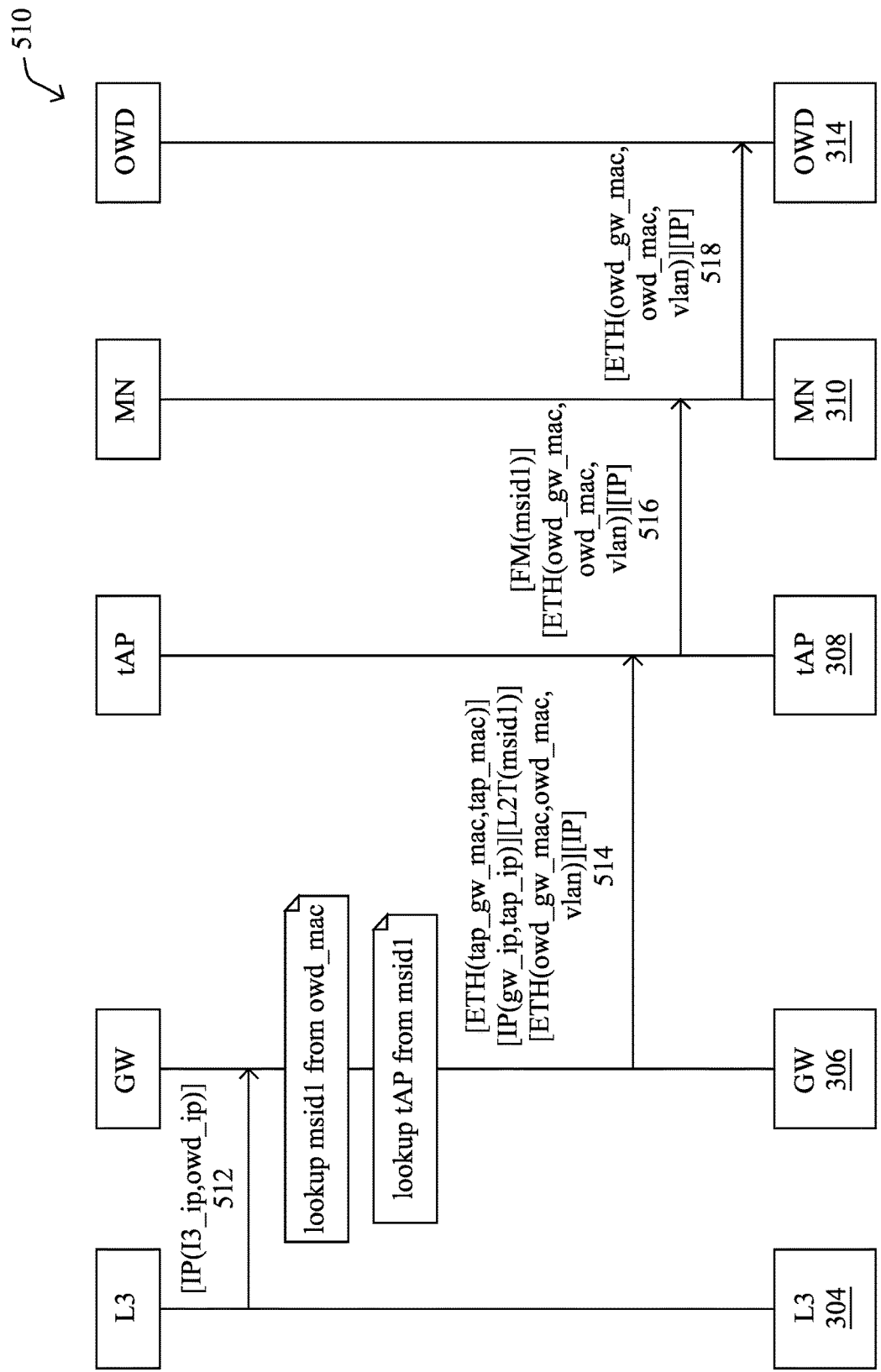

Using the mapping, GW 306 can quickly identify how to reach OWD 314, when it reaches traffic destined for OWD 314. For instance, FIG. 5B illustrates an example communication diagram 510 showing the processing of downstream traffic destined for OWD 314.

As shown in communication diagram 510, assume that GW 306 subsequently receives a communication 512 from the L3-routed network 304 that is destined for OWD 314. In turn, GW 306 may perform a lookup of the MSID of mobile system 302 based on the included MAC address of OWD 314. In addition, GW 306 may identify the tAP 308 associated with the MSID. This provides GW 306 enough information to know to send communication 512 on towards tAP 308 via their L2 tunnel as communication 514. In turn, tAP 308 may send the message on to MN 310 via their wireless connection as communication 516. This allows MN 310 to send the message on to OWD 314 as communication 518 via the local network of mobile system 302 (e.g., via the local Ethernet network of mobile system 302).

Referring again to FIG. 4, consider now the case in which mobile system 302 roams from one tAP 308 to another. Typically, mobile system 302 may maintain at least two wireless connections with the backhaul system: an 'active' wireless connection 318 and an 'inactive' wireless connection 318, each wireless connection 318 being between a different [MN 310, tAP 308] pair. For instance, assume that wireless connection 318a is the primary connection for mobile system 302.

As mobile system 302 travels, the control plane of mobile system 302 may decide to roam from connecting to the backhaul system via tAP 308a to connection to the backhaul system via tAP 308b. This roaming decision may be based on any number of factors, such as received signal strength indicator (RSSI) information of beacons sent by the tAPs 308 and received by the MNs 310. Regardless of the specific roaming algorithm used, assume now that mobile system 302 decides to switch to using wireless connection 318b between MN 310b and tAP 308b as its active wireless connection. In doing so, mobile system 302 may also now consider wireless connection 318a as its 'inactive' connection. Accordingly, mobile system 302 may send all subsequent upstream traffic via MN 310b and wireless connection 318b, as opposed to MN 310a and wireless connection 318a, which it was using, previously.

According to various embodiments, MN 310b may send an indication of the roaming decision to tAP 308b that includes the MSID of mobile system 302. In turn, tAP 308b may notify GW 306 of the roaming, which then updates its mapping(s) to now associate mobile system 302 with tAP 308b, as well as any corresponding associations with onboard devices 314 located on mobile system 302. This allows GW 306 to immediately begin sending any traffic destined for mobile system 302 via the new wireless connection 318b, instead of the old wireless connection 318a.

Figure 6A:
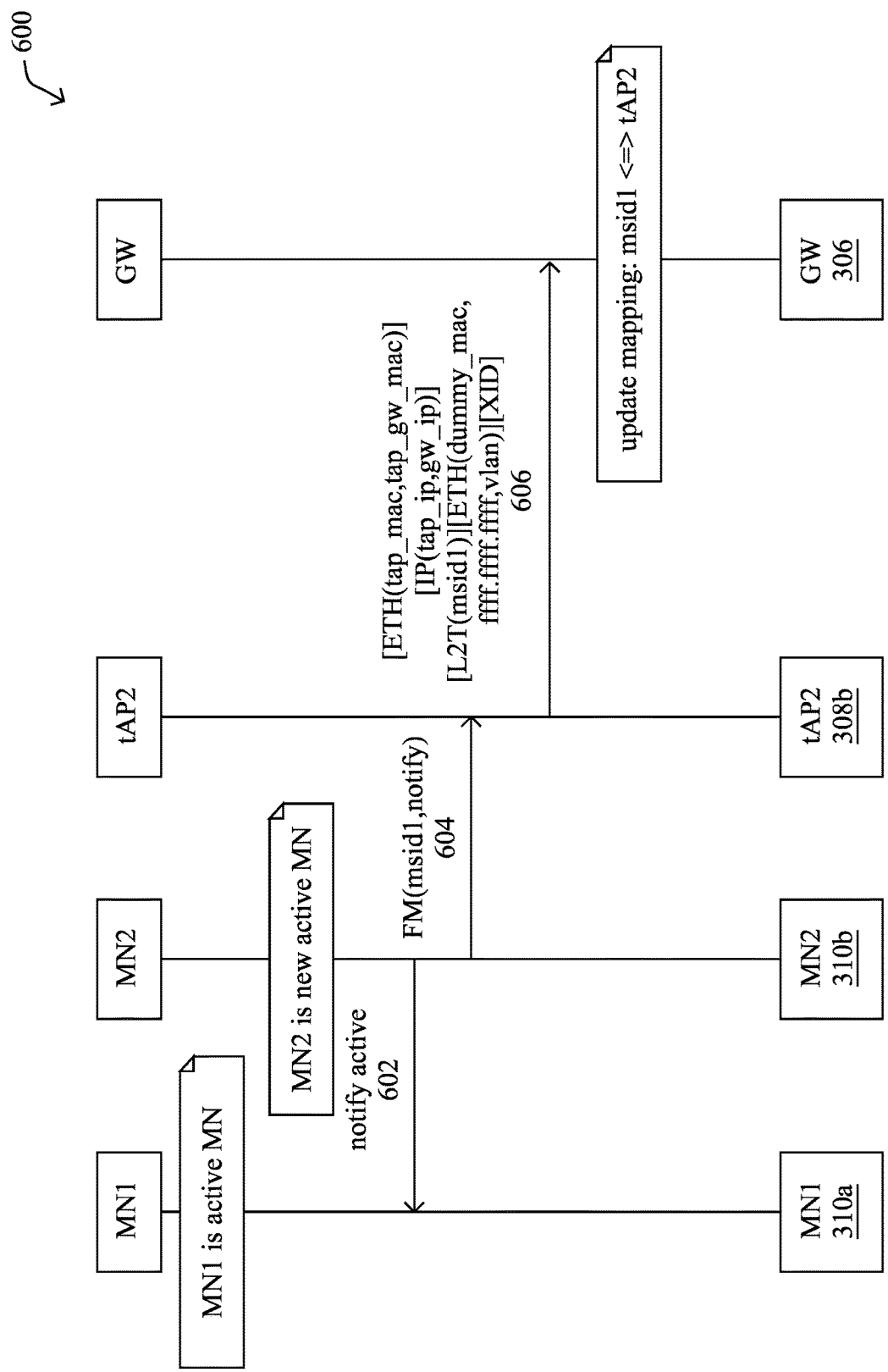
FIGS. 6A-6B illustrate example communication diagrams showing a mobile system roaming.

FIG. 6A illustrates an example communication diagram 600 showing a mobile system roaming, according to various embodiments. As shown, assume that GW 306 has already generated a mapping that associates the MSID of mobile system 302 with a particular tAP 308 (e.g., tAP 308a in FIG. 4), which has a wireless connection with MN 310a and is the active connection for mobile system 302.

Now, assume that mobile system 302 is going to roam to a second wireless connection between MN 310b and tAP 308b. In such a case, as shown, MN 310b may send a notification 602 to MN 310a that indicates that MN 310b is going to take over as the active MN and that its wireless connection with tAP 308b will serve as the active connection for mobile system 302. Thus, MN 310a will become the inactive MN 310 and mobile system 302 will stop using its wireless connection for further upstream traffic.

According to various embodiments, MN 310b may also send communication 604 to tAP 308b that includes an indication of the roaming decision, as well as the MSID of mobile system 302. In turn, tAP 308b may encapsulate communication 604 as communication 606 and send it to GW 306 via their L2 tunnel. As shown, tAP 308b may also include the MSID of mobile system 302 in the tunnel header of communication 606.

Based on communication 606, GW 306 may update its mapping(s) that it has for mobile system 302, such as by associating the MSID of mobile system 302 with tAP 308b. In addition, GW 306 may also update any mappings that it has for any onboard devices of mobile system 302. For instance, assume that tAP 308b has a MAC address of 0102.03AA.0002 and that GW 306 is currently maintaining the mapping shown previously in Table 1. In such a case, GW 306 may use the information in communication 606 to update this mapping as follows:

TABLE 2

| OWD MAC | MSID | tAP MAC |
|---|---|---|
| 6300.6300.6300.6300 | FF0001 | 0102.03AA.0002 |

Using the updated mapping in Table 2, GW 306 can then send any subsequent downstream traffic destined for mobile system 302 or, more particularly, to the OWD with MAC address 6300.6300.6300.6300, via tAP 308b, which shares the active wireless connection with MN 310b on mobile system 302. This allows GW 306 to be able to continue to reach mobile system 302 and the destination OWD, without an increased chance of packet loss.

Figure 6B:
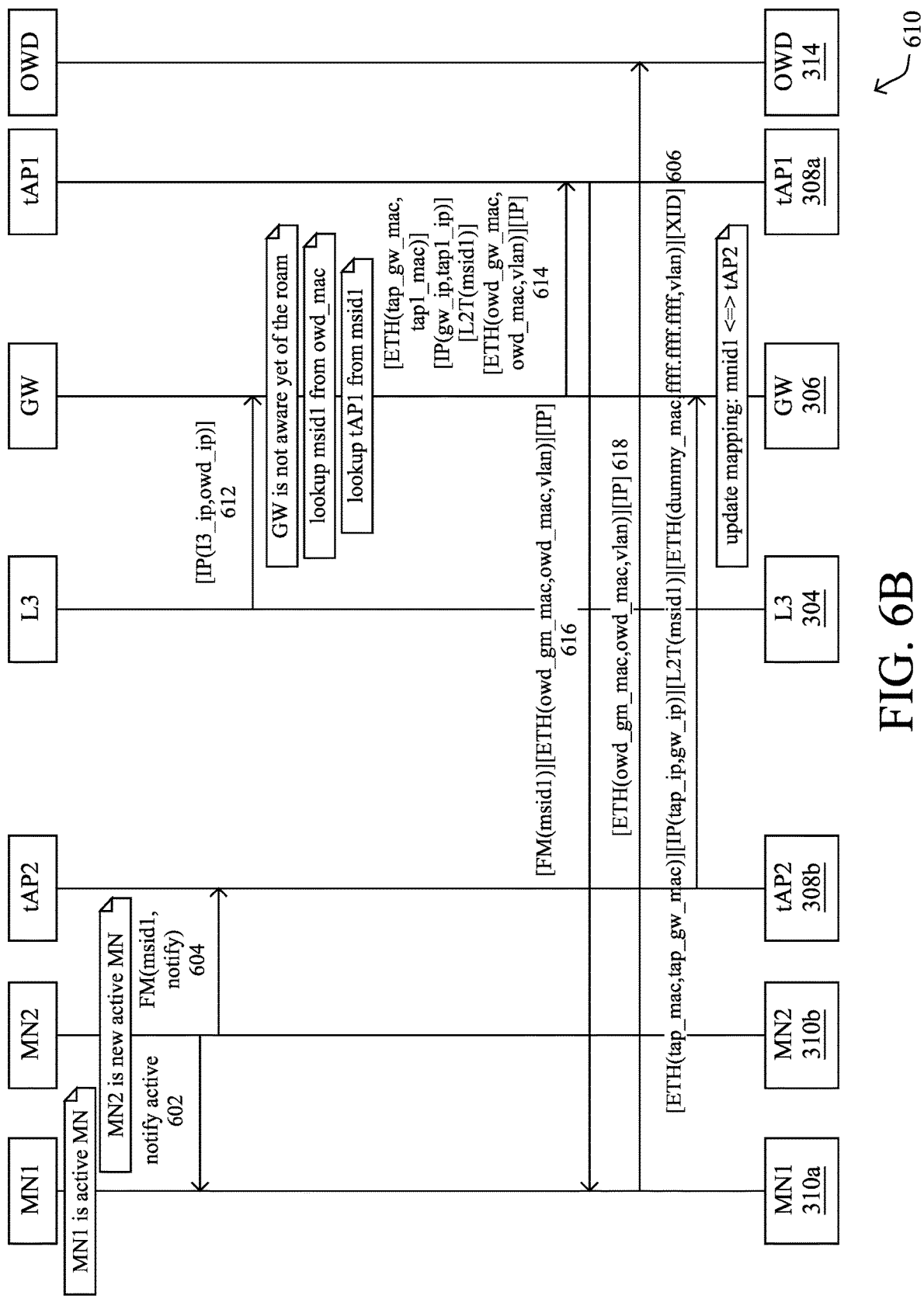

Note that there may still be some in-flight packets sent from the gateway via the old wireless connection, during the roaming handoff process. FIG. 6B illustrates an example communication diagram 610 showing a mechanism to handle this situation, according to various embodiments.

As shown in communication diagram 610, again assume that MN 310b is taking over as the active MN 310 of MN 310 and sends notification 602 to MN 310a and communication 604 to tAP 308b with the MSID of mobile system 302, as in the case of communication diagram 610. However, prior to tAP 308b sending communication 606 to GW 306 to notify GW 306 of the roaming, assume now that GW 306 receives a downstream communication 612 from L3-routed network 304 that is destined for OWD 314.

Since GW 306 has not yet received communication 606 from tAP 308b of the roaming by mobile system 302, it may perform a lookup of its current mapping for OWD 314 based on the address information in communication 612. Thus, GW 306 may determine that downstream communication 612 should be sent onward to tAP 308a via their L2 tunnel as communication 614, despite the active wireless connection now being between MN 310b and tAP 308b. In turn, tAP 308a may send communication 614 onward to MN 310a as communication 616 via their wireless connection, which has now been deemed inactive. Finally, MN 310a may send communication 616 onward to the destination OWD 314 via the local network of mobile system 302.

This forwarding of downstream communications via tAP 308a may continue until GW 306 receives communication 606 and updates its mappings for mobile system 302. After that occurs, GW 306 may begin forwarding the downstream communications destined for mobile system 302 via tAP 308b. Since mobile system 302 is responsible for the roaming decision, it may immediately switch to using MN 310b instead of MN 310a to send any upstream traffic to GW 306, once the roaming notification has been promulgated within mobile system 302.

Figure 7:
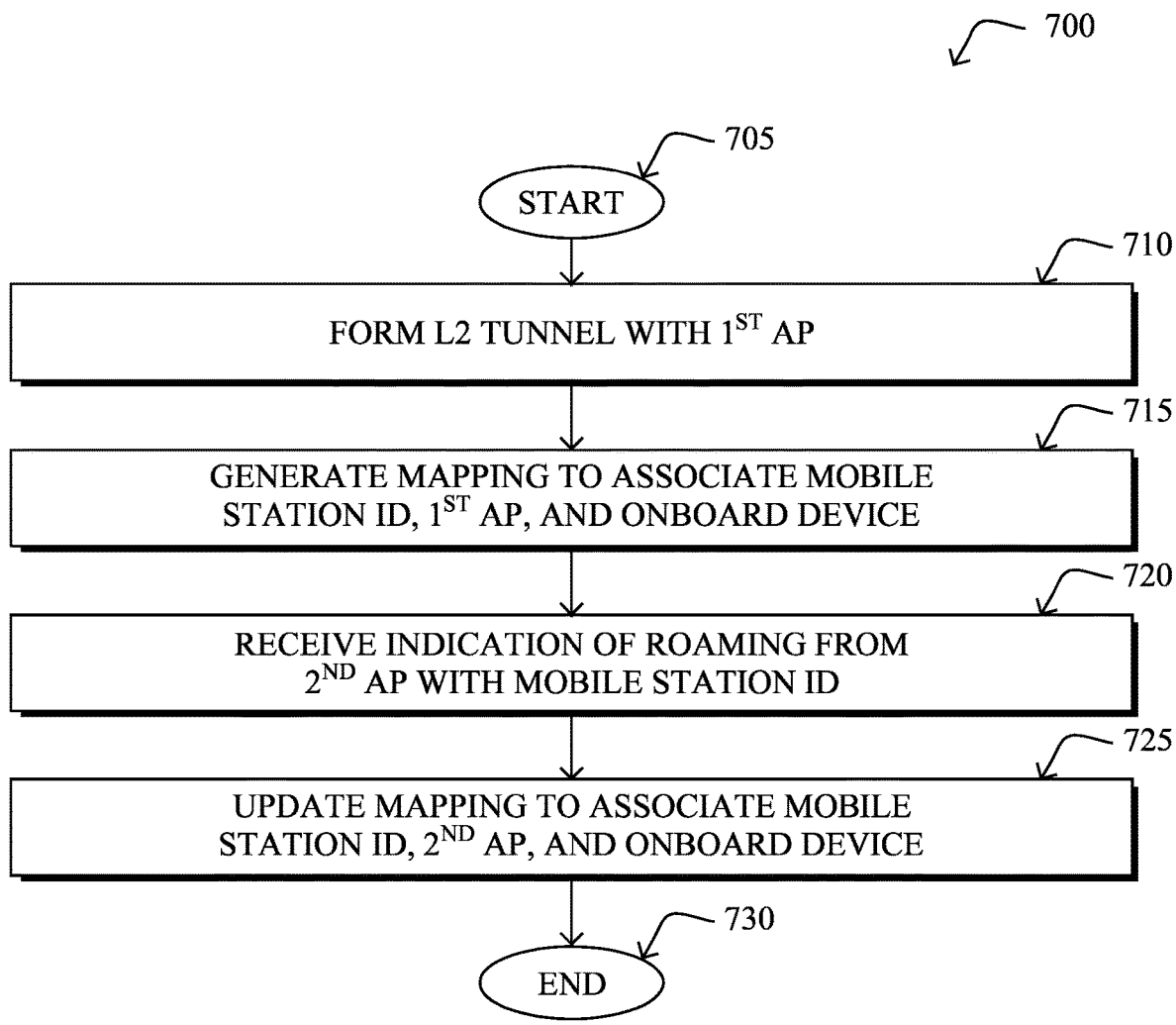
FIG. 7 illustrates an example simplified procedure for providing connectivity to a mobile system.

FIG. 7 illustrates an example simplified procedure for providing connectivity to a mobile system, in accordance with one or more embodiments described herein. For example, a non-generic, specifically configured device/apparatus (e.g., device 200), such as a gateway to a Layer-3 network, another device in communication therewith, another networking device, or the like, may perform procedure 700 by executing stored instructions (e.g., communication process 248). The procedure 700 may start at step 705, and continues to step 710, where, as described in greater detail above, the gateway may form a first Layer-2 tunnel between the gateway and a first wireless access point. For instance, the gateway and the first wireless access point may communicate with one another via an Ethernet or other Layer-2 connection. In some embodiments, the first wireless access point communicates wirelessly with a first mobile node of a mobile system via a first wireless connection. In further embodiments, the first wireless access point may provide an identifier for the mobile system as part of the formation of the Layer-2 tunnel, so that the gateway can associate the identifier for the mobile system with the tunnel.

At step 715, as detailed above, the gateway may generate a mapping that associates an onboard device of the mobile system with the first wireless access point and the identifier for the mobile system. As would be appreciated, the Layer-2 tunnel will typically be formed before any traffic is sent by the onboard device to the Layer-3 network, meaning that the gateway will not have such an association at that time. However, once the Layer-2 tunnel is formed, the first wireless access point may include the identifier for the mobile system in a tunnel header used to convey traffic from the onboard device via the Layer-2 tunnel to the gateway. In this way, the gateway may learn that the onboard device is associated with the first wireless access point and the mobile system. Using such a mapping, the gateway can then send any traffic that it receives for the onboard device to the first wireless access point, for eventual delivery to the onboard device.

At step 720, the gateway may receive, from a second wireless access point, an indication that the mobile system is roaming from the first wireless connection to a second wireless connection between the second wireless access point and a second mobile node of the mobile system, as described in greater detail above. In various embodiments, the roaming indication may also include the identifier for the mobile system. In other words, when the mobile system decides to roam to the second wireless access point and form a new wireless connection with it, the mobile system may provide its mobile system identifier to the second wireless access point.

At step 725, as detailed above, the gateway may update the mapping to associate the onboard device of the mobile system with the second wireless access point, based on the indication that the mobile system is roaming to the second wireless connection. In other words, even though the mobile system may be connected to the gateway using a completely different mobile node of the mobile system, as well as a different wireless access point of the backend system, the gateway can immediately update its entries for the onboard device such that new traffic to it can be sent via the second wireless connection. As would be appreciated, this provides for a seamless roaming of the mobile system without affecting the traffic associated with the onboard device. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a wireless backhauling system using a mono-tunnel for fast-moving mobile domains that provides for seamless roaming across access points. In particular, the techniques introduced herein reduce overhead and signaling for roaming handoffs, helping to ensure connectivity to the mobile domain.

While there have been shown and described illustrative embodiments that provide for a wireless backhauling system, it is to be understood that various other adaptations and modifications may be made within the spirit and scope of the embodiments herein. For example, while certain embodiments are described herein with respect to using certain wired and/or wireless protocols, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
forming, by a gateway to a Layer-3 network, a first Layer-2 tunnel between the gateway and a first wireless access point, and a second Layer-2 tunnel between the gateway and a second wireless access point, wherein the first wireless access point communicates wirelessly with a first mobile node of a mobile system via a first wireless connection, wherein the mobile system comprises a mobile domain that is connected to a plurality of onboard devices;
generating, by the gateway, a mapping that associates at least one onboard device of the mobile system with the first wireless access point and an identifier for the mobile system, based on traffic conveyed via the first Layer-2 tunnel and associated with the onboard device, wherein the first wireless access point adds a Layer-2 tunnel header to the traffic that indicates the identifier for the mobile system;
receiving, at the gateway and from the second wireless access point via the second Layer-2 tunnel, an indication that the mobile system is roaming from the first wireless connection to a second wireless connection between the second wireless access point and a second mobile node of the mobile system, the indication including the identifier for the mobile system, wherein the second mobile node of the mobile system notifies the second wireless access point that the mobile system is roaming to the second wireless access point, in part by sending the identifier for the mobile system to the second wireless access point; and
updating, by the gateway, the mapping to associate the onboard device of the mobile system with the second wireless access point, based on the indication that the mobile system is roaming.

2. The method as in claim 1, further comprising:
receiving, at the gateway and from the Layer-3 network, traffic destined for the onboard device of the mobile system; and
sending, by the gateway and via the first Layer-2 tunnel, the traffic destined for the onboard device, based on the mapping that associates the onboard device of the mobile system with the first wireless access point and the identifier for the mobile system.

3. The method as in claim 1, further comprising:
receiving, at the gateway and from the first wireless access point, the traffic conveyed via the first Layer-2 tunnel and associated with the onboard device, the traffic having been sent by the onboard device.

4. The method as in claim 1, wherein the mapping identifies the onboard device by its media access control (MAC) address.

5. The method as in claim 1, wherein the mobile system comprises a vehicle moving along a path, and wherein the first wireless access point and the second wireless access point are located along the path.

6. The method as in claim 5, wherein the vehicle comprises a train, and wherein the path comprises a railroad track.

7. The method as in claim 1, wherein the first mobile node is configured to send packets to the onboard device that are addressed to the onboard device and received via the first wireless connection, after the mobile system has roamed to the second wireless connection.

8. The method as in claim 1, wherein the gateway is connected to the first wireless access point and to the second wireless access point via Ethernet.

9. An apparatus, comprising:
one or more network interfaces, wherein at least one interface is connected to a Layer-3 network;
a processor coupled to the one or more network interfaces and configured to execute one or more processes; and
a memory configured to store a process that is executable by the processor, the process when executed configured to:
form a first Layer-2 tunnel between the apparatus and a first wireless access point, and a second Layer-2 tunnel between the apparatus and a second wireless access point, wherein the first wireless access point communicates wirelessly with a first mobile node of a mobile system via a first wireless connection, wherein the mobile system comprises a mobile domain that is connected to a plurality of onboard devices;
generate a mapping that associates at least one onboard device of the mobile system with the first wireless access point and an identifier for the mobile system, based on traffic conveyed via the first Layer-2 tunnel and associated with the onboard device, wherein the first wireless access point adds a Layer-2 tunnel header to the traffic that indicates the identifier for the mobile system;
receive, from the second wireless access point via the second Layer-2 tunnel, an indication that the mobile system is roaming from the first wireless connection to a second wireless connection between the second wireless access point and a second mobile node of the mobile system, the indication including the identifier for the mobile system, wherein the second mobile node of the mobile system notifies the second wireless access point that the mobile system is roaming to the second wireless access point, in part by sending the identifier for the mobile system to the second wireless access point; and
update the mapping to associate the onboard device of the mobile system with the second wireless access point, based on the indication that the mobile system is roaming.

10. The apparatus as in claim 9, wherein the process when executed is further configured to:
receive, from the Layer-3 network, traffic destined for the onboard device of the mobile system; and
send, via the first Layer-2 tunnel, the traffic destined for the onboard device, based on the mapping that associates the onboard device of the mobile system with the first wireless access point and the identifier for the mobile system.

11. The apparatus as in claim 9, wherein the process when executed is further configured to:
receive, from the first wireless access point, the traffic conveyed via the first Layer-2 tunnel and associated with the onboard device, the traffic having been sent by the onboard device.

12. The apparatus as in claim 9, wherein the mapping identifies the onboard device by its media access control (MAC) address.

13. The apparatus as in claim 9, wherein the mobile system comprises a vehicle moving along a path, and wherein the first wireless access point and the second wireless access point are located along the path.

14. The apparatus as in claim 13, wherein the vehicle comprises a train, and wherein the path comprises a railroad track.

15. The apparatus as in claim 9, wherein the first mobile node is configured to send packets to the onboard device that are addressed to the onboard device and received via the first wireless connection, after the mobile system has roamed to the second wireless connection.

16. A tangible, non-transitory, computer-readable medium storing program instructions that cause a gateway to a Layer-3 network to execute a process comprising:
- forming, by the gateway to the Layer-3 network, a first Layer-2 tunnel between the gateway and a first wireless access point, and a second Layer-2 tunnel between the gateway and a second wireless access point, wherein the first wireless access point communicates wirelessly with a first mobile node of a mobile system via a first wireless connection, wherein the mobile system comprises a mobile domain that is connected to a plurality of onboard devices;
- generating, by the gateway, a mapping that associates at least one onboard device of the mobile system with the first wireless access point and an identifier for the mobile system, based on traffic conveyed via the first Layer-2 tunnel and associated with the onboard device, wherein the first wireless access point adds a Layer-2 tunnel header to the traffic that indicates the identifier for the mobile system;
- receiving, at the gateway and from the second wireless access point via the second Layer-2 tunnel, an indication that the mobile system is roaming from the first wireless connection to a second wireless connection between the second wireless access point and a second mobile node of the mobile system, the indication including the identifier for the mobile system, wherein the second mobile node of the mobile system notifies the second wireless access point that the mobile system is roaming to the second wireless access point, in part by sending the identifier for the mobile system to the second wireless access point; and
- updating, by the gateway, the mapping to associate the onboard device of the mobile system with the second wireless access point, based on the indication that the mobile system is roaming.

\* \* \* \* \*